(12) United States Patent
Yap et al.

(10) Patent No.: US 6,482,532 B1
(45) Date of Patent: Nov. 19, 2002

(54) EASY TEAR NON-HALOGENIC FOOD WRAP

(75) Inventors: Peter C. C. Yap, Singapore (SG); Shih-Yaw Lai, Singapore (SG)

(73) Assignee: Dow Global Technologies Inc., Midland, MI (US)

( * ) Notice: Subject to any disclaimer, the term of this patent is extended or adjusted under 35 U.S.C. 154(b) by 191 days.

(21) Appl. No.: 09/589,925

(22) Filed: Jun. 7, 2000

(51) Int. Cl.$^7$ ............................................. B32B 27/32
(52) U.S. Cl. ...................... 428/516; 428/523; 428/910; 264/173.15; 264/173.19; 525/240
(58) Field of Search ................................ 428/523, 515, 428/516, 910; 525/240; 264/290.2, 173.15, 173.19

(56) References Cited

U.S. PATENT DOCUMENTS

| | | | |
|---|---|---|---|
| 3,645,992 A | 2/1972 | Elston | 260/80.78 |
| 4,076,698 A | 2/1978 | Anderson et al. | 526/348.6 |
| 4,486,552 A | 12/1984 | Niemann | 523/169 |
| 4,798,081 A | 1/1989 | Hazlitt et al. | 73/53 |
| 4,835,194 A | 5/1989 | Bright et al. | 523/169 |
| 5,008,204 A | 4/1991 | Stehling | 436/85 |
| 5,026,798 A | 6/1991 | Canich | 526/127 |
| 5,055,438 A | 10/1991 | Canich | 502/117 |
| 5,089,321 A | 2/1992 | Chum et al. | 428/218 |
| 5,112,674 A | 5/1992 | German et al. | 428/216 |
| 5,169,728 A | 12/1992 | Murphy et al. | 428/516 |
| 5,272,236 A | 12/1993 | Lai et al. | 526/348.5 |
| 5,278,272 A | 1/1994 | Lai et al. | 526/348.5 |
| 5,427,807 A | 6/1995 | Chum et al. | 426/393 |
| 5,582,923 A | * 12/1996 | Kale et al. | 264/171.23 |
| 5,591,390 A | 1/1997 | Walton et al. | 264/456 |
| 5,665,800 A | 9/1997 | Lai et al. | 524/115 |
| 5,747,594 A | * 5/1998 | deGroot et al. | 428/516 |
| 5,773,106 A | * 6/1998 | deGroot et al. | 428/35.7 |
| 5,783,638 A | 7/1998 | Lai et al. | 525/240 |
| 5,879,768 A | 3/1999 | Falla et al. | 428/35.7 |

FOREIGN PATENT DOCUMENTS

| | | |
|---|---|---|
| EP | 0 243 965 A2 | 11/1987 |
| EP | 0 333 508 A2 | 9/1989 |
| EP | 0 404 969 A1 | 1/1991 |
| WO | 96/12762 | 5/1996 |

OTHER PUBLICATIONS

Wild, L., et al., *Determination of Branching Distributions in Polyethylene and Ethylene Copolymers*, Journal of Polymer Science: Polymer Physics Edition, vol. 20, pp. 441–455 (1982).

Williams, T., et al., *The Construction of a Polyethylene Calibration Curve for Gel Permeation Chromatography Using Polystyrene Fractions*, Polymer Letters, vol. 6, pp. 621–624 (1968).

Butler, Thomas I., et al., *Coextrusion Basics*, Film Extrusion Manual: Pieces, Materials, Properties, TAPPI Press, pp. 31–80 (1992).

Jenkins, Wilmer A., et al., Packaging Foods with Plastics, pp. 19–27 and 78–83.

Dumbleton, David, *Lamination vs. Coextrusion*, Converting Magazine, pp. 112–116, Sep. 1992.

Schrenk, W.J., et al., *Coextrusion for Barrier Packaging*, The Society of Plastics Engineers RETEC, pp. 211–229, Jun. 1981.

Rodriguez, Ferdinand, *Mechanical Properties at Small Deformations*, Principles of Polymer Systems, pp. 194–221.

Muccio, Edward A., *Extrusion*, Plastics Processing Technology, pp. 69–101, 1994.

Osborn, Kenton R., et al., Plastic Films: Technology and Packaging Applications, pp. 1–74 (1992).

* cited by examiner

Primary Examiner—D. Lawrence Tarazano

(57) ABSTRACT

Easy-tear, non-halogenated, high-clarity ethylene polymer films are described that do not contain migratory additives and that are useful as a domestic food wrap. These films also exhibit high inherent cling values. In one embodiment, the film is multilayered in which the outer layers comprise a very low density heterogeneously linear polyethylene or a homogeneously branched polyethylene, preferably a substantially linear ethylene polymer, and the inner layer(s) comprise a low density polyethylene. In another embodiment, the film is a monolayer, or multiple layers of the same formula, in which the film comprises a mixture of a very low density heterogeneous linear polyethylene or a homogeneously branched polyethylene, preferably a SLEP, and a LDPE.

34 Claims, No Drawings

EASY TEAR NON-HALOGENIC FOOD WRAP

FIELD OF THE INVENTION

This invention relates to food wraps, in particular food wraps for domestic use. In one S aspect, this invention relates to non-halogenic stretch wraps that are easy to tear in the cross-direction. In another aspect, this invention relates to a plastic film with an oriented film structure having at least one film layer comprising a substantially linear ethylene polymer (SLEP), a low density polyethylene (LDPE), and an anti-fogging agent. In yet another aspect, this invention relates to a plastic film having a film structure comprising at least one inner layer comprising an LDPE sandwiched between two outer layers each comprising an SLEP.

BACKGROUND OF THE INVENTION

In the modern distribution and marketing of food products, a multitude of different packaging materials are used. One principal category of food packaging materials is plastic film. Many different kinds of plastic film exist, both in composition and structure, and some are tailored to specific applications while others are more generic in nature.

Currently, polyvinyl chloride (PVC) film is the predominate plastic film used to wrap retail-cut red meat and similar products, e.g. fresh fish, poultry, vegetables, fruits, etc., due to its many desirable properties and its low cost relative to other plastic films. Representative of these desirable properties are clarity, oxygen transmission, flexibility, toughness, heat sealability, elastic recovery, and processability. However, most PVC films include a plasticizer to obtain the desired flexibility, and a growing concern exists as to the carcinogenic properties of the most commonly used PVC film plasticizer and the tendency of this plasticizer to migrate from the film to the food product. On a more fundamental level, a growing concern also exists regarding the use in food wrapping applications of any plastic film comprising one or more chlorinated polymers. The concern is based on the tendency for chlorinated polymers to yield corrosive acid when thermally degraded or incinerated, as well as concern regarding the general difficulty involved in recycling chlorinated polymers.

In the search for alternatives to PVC film, various monolayer olefin films, particularly polyethylene films, have been considered but none have been found to be without at least one flaw that has blocked its commercial acceptability. High density polyethylene (HDPE) is much too inelastic to be useful as a commercial wrap, while the various LDPEs, e.g., linear low density polyethylene (LLDPE), ultra low density polyethylene (ULDPE), etc., do not possess sufficient elastic recovery, e.g. the film retains impressions or dents from the fingers and poking of potential purchasers who have handled the wrapped product while inspecting its contents. This can be detrimental to the sale value of the food product because the wrapped product will quickly lose its pristine appearance which in turn may cause subsequent potential buyers to intentionally avoid a perfectly good product that now has the appearance of one repeatedly rejected by earlier potential purchasers. The use of nontoxic plasticizers, such as corn oil, has not proven totally satisfactory, particularly with respect to their temperature stability.

Various multilayer films have also been considered (e.g. those taught in U.S. Pat. No. 5,112,674 and in EPO 0 243 965, 0 333 508 and 0 404 969), and significant among these are films made by co-extrusion of polyethylene with an ethylene/α,β-unsaturated carbonyl copolymer, such as ethylene vinyl acetate (EVA) or ethylene acrylic acid (EAA). While these films demonstrate an elastic recovery similar to PVC film, EVA and EAA are relatively expensive copolymers. Moreover, ethylene/α,β-unsaturated carbonyl copolymers are relatively difficult to fabricate, have a tendency to impart an offensive taste and/or odor to the food product, and are known to interfere with anti-fogging agents.

In other food wrap applications, other properties may have importance. For example, in the wrapping of primal cuts of meat (i.e., whole or sectioned carcasses of beef, pork, etc.) for long-distance shipping or long-term storage, shrink and oxygen impermeability are important properties. Consequently, these film are often multilayer structures comprising at least one oxygen barrier, e.g. SARAN (trademark of The Dow Chemical Company for a vinyl chloride-vinylidene chloride copolymer), sandwiched between two layers of a material with good shrink and abuse properties, e.g. LLDPE. In the wrapping of foods using form-fill-seal technology, hot tack is an important property and accordingly, such wraps are frequently multilayer structures with at least one skin layer comprising LLDPE or ionomer. The other film layers are constructed from materials which impart the desired properties relative to the food to be packaged, e.g. SARAN for an oxygen barrier, PVC for elastic recovery, etc.

The plastic wrap industry has continued to search for products that provide the desired cling without the use of migratory additives. The plastic wrap industry also continues to seek an improved non-halogenic alternative to PVC film. Another goal of the plastic wrap industry is to develop a food wrap for home-use that is easy to tear using the crude cutter bars normally associated with home food wraps.

SUMMARY OF THE INVENTION

One embodiment of the invention is an oriented film structure for an easy-tear food wrap, the film structure comprising at least one layer, the layer comprising:

(A) at least one homogeneously branched polyethylene comprising an interpolymer of ethylene and, preferably at least one α-olefin, the homogeneously branched polyethylene characterized by a:
  (i) density less than about 0.940 g/cm$^3$,
  (ii) melt index of about 0.5 to about 20 g/10 min,
  (iii) machine-direction orientation as characterized by a machine direction elongation of less than about 200% as determined by ASTM D882 using a sample width of 10 mm, and
  (iv) relaxation time of about 0.005 to about 1.0 s; and (B) at least one LDPE characterized by a:
  (i) melt index of about 2.0 to about 20.0 g/10 min,
  (ii) number average molecular weight of less than about 17,000, and
  (iii) relaxation time of about 0.5 to 5.0 s, wherein the relaxation time of the LDPE is longer than the relaxation time of the homogeneously branched polyethylene.

Another embodiment of the invention is an oriented film structure for an easy-tear food wrap, the film structure comprising an inner layer laminated between two outer layers, wherein:

(A) each outer layer comprising at least one homogeneously branched polyethylene comprising an interpolymer of ethylene and, preferably at least one α-olefin, the homogeneously branched polyethylene characterized by a:
(i) density less than about 0.940 g/cm³,
(ii) melt index of about 0.5 to about 20 g/10 min,
(iii) machine-direction orientation as characterized by a machine direction elongation of less than about 200% as determined by ASTM D882 using a sample width of 10 mm, and
(iv) relaxation time of about 0.005 to about 1.0 s; and
(B) the inner layer comprising at least one LDPE characterized by a:
(i) melt index of about 2.0 to about 20.0 g/10 min,
(ii) number average molecular weight of less than about 17,000, and
(iii) relaxation time of about 0.5 to 5.0 s, wherein the relaxation time of the LDPE is longer than the relaxation time of the homogeneously branched polyethylene.

Another embodiment of the invention is a method of producing an oriented film structure for an easy-tear food wrap, the method comprising the steps:
(A) admixing at least two components to form a mixture, the mixture comprising
(i) at least one homogeneously branched polyethylene comprising an interpolymer of ethylene, preferably at least one α-olefin, the homogeneously branched polyethylene characterized by:
(a) a density less than about 0.940 g/cm³,
(b) a melt index of 0.5 to 20 g/10 min,
(c) a machine-direction orientation as characterized by a machine direction elongation of less than about 200% as determined by ASTM D882 using a sample width of 10 mm, and
(d) a relaxation time of about 0.005 to about 1.0 s; and
(ii) at least one low-density polyethylene (LDPE), the LDPE characterized by:
(a) a melt index of 2.0 to 20.0 g/10 min,
(b) a number average molecular weight of less than about 17,000,
(c) a relaxation time of about 0.5 to 5.0 s, wherein the relaxation time of the LDPE is longer than the relaxation time of the homogeneously branched polyethylene;
(B) heating the mixture to melt the mixture;
(C) forming the melted mixture into a molten film structure, the molten film structure comprising at least one layer in which both the homogeneously branched polyethylene and the LDPE are oriented in the cross-direction;
(D) imposing a machine-direction stress in the molten film structure via mechanical means or thermal means or both in order to obtain a machine-direction orientation in the homogeneously branched polyethylene in preference to in the LDPE;
(E) cooling the molten film structure to solidify the film structure, such that the time elapsed between forming the molten film structure and solidifying the film structure is less than the relaxation time of the LDPE, thereby freezing the homogeneously branched polyethylene in the machine-direction orientation and the LDPE in a cross-direction orientation.

Yet another embodiment of the invention is a method of producing an oriented film structure for an easy-tear food wrap, the method comprising the steps of:
(A) melting at least one homogeneously branched polyethylene comprising an interpolymer of ethylene and, preferably at least one α-olefin, the homogeneously branched polyethylene characterized by a:
(i) density less than about 0.940 g/cm³,
(ii) melt index of about 0.5 to about 20 g/10 min,
(iii) machine-direction orientation as characterized by a machine direction elongation of less than about 200% as determined by ASTM D882 using a sample width of 10 mm, and
(iv) a relaxation time of about 0.005 to about 1.0 s; and
(B) melting, separately from the homogeneously branched polyethylene, at least one LDPE characterized by a:
(i) melt index of about 2.0 to about 20.0 g/10 min,
(ii) number average molecular weight of less than about 17,000,
(iii) relaxation time of about 0.5 to 5.0 s, wherein the relaxation time of the LDPE is longer than the relaxation time of the homogeneously branched polyethylene; and
(C) forming the melted homogeneously branched polyethylene of (A) and the melted LDPE of (B) into a soft film structure, wherein:
(i) the molten film structure comprises an inner layer comprising the LDPE sandwiched between two outer layers, of the homogeneously branched polyethylene, and
(ii) both the homogeneously branched polyethylene and the LDPE are oriented in the cross-direction;
(D) imparting a machine-direction orientation to the homogeneously branched polyethylene relative to the LDPE; and
(E) solidifying the molten film structure such that the time elapsed between forming the film structure and solidifying it is about 0.005 to about 1.0 s, thereby freezing the homogeneously branched polyethylene in a machine-direction orientation and the LDPE in a cross-direction orientation.

Other embodiments to the invention include the film structures produced by the methods of this invention.

DESCRIPTION OF THE PREFERRED EMBODIMENTS

The term "oriented" refers to the alignment of the individual polymer molecules in a certain direction. The molecules of an oriented polymer will not be in perfect parallel arrangement due to the size of the molecules, the entanglements within and among polymer molecules, and the presence, if any, of side branches from the polymer chain. However, straight sections of oriented polymer molecules will be preferentially aligned in the direction of orientation.

The "orientation" of a polymer or a film is the direction in which the individual polymer molecules are preferentially aligned. "Preferential alignment" indicates that more sections of the individual polymer molecules are present as straight sections aligned in the direction of orientation than would occur randomly.

The term "machine-direction" refers to an orientation along the line of of the film structure from the forming die. The term "cross-direction" refers to an orientation perpendicular, within the plane of the film structure, to machine-direction.

The polymers that are useful in this invention are known in the art. Included among these polymers are (i) heterogeneously linear low density ethylene interpolymers (heterogeneous LLDPE) made using Ziegler-Natta catalysts in a slurry, gas phase, solution or high pressure process, such as described in U.S. Pat. No. 4,076,698; (ii) homogeneous linear ethylene polymers such as (a) those described in U.S. Pat. No. 3,645,992 and (b) those made using the so-called single site catalysts in a batch reactor having relatively high olefin concentrations as described, for example, in U.S. Pat. Nos. 5,026,798 and 5,055,438; and (iii) homogeneously branched polyethylene polymers. Homogeneously branched polyethylene polymers are commercially available. Each of the U.S. patents cited in this paragraph are incorporated herein by reference.

The term "low density polyethylene", or LDPE, designates a polymer comprising an ethylene homopolymer or an interpolymer of ethylene and an α-olefin, in which the polymer has a density of no more than 0.94 g/cm$^3$.

As here used, "interpolymer" means a polymer of two or more comonomers, e.g. a copolymer, terpolymer, etc.

The term "heterogeneously branched linear ethylene polymer" refers to Ziegler polymerized linear low density polyethylene or Ziegler polymerized ultra low density polyethylene. Heterogeneously branched linear ethylene polymers are copolymers of ethylene and an alpha-olefin having a distribution of branching which includes a highly branched portion, a medium branched portion, and an essentially linear portion. Heterogeneously branched linear ethylene polymers are available from The Dow Chemical Company under the trademarks ATTANE and DOWLEX. The heterogeneously branched linear ethylene polymer useful in the practice of the invention will have a density of from about 0.890 to about 0.940 g/cm$^3$, preferably from about 0.890 to about 0.920 g/cm$^3$. The heterogeneously branched linear ethylene polymer useful in the practice of the invention will have a melt index of from about 0.1 to about 100 g/10 min, preferably from about 0.5 to about 5 g/10 min (as determined by ASTM D-1238, Procedure A, 190/2.16, at a temperature of 190 C.).

The term "homogeneously branched linear ethylene polymer" means that the interpolymer does not exhibit long chain branching as measured by $^{13}$C NMR or gel permeation chromatography coupled with a differential viscosity detector. The absence of measurable long chain branching is one of the features that distinguish homogeneously branched linear ethylene polymers from homogeneously branched substantially linear ethylene polymers which are described in U.S. Pat. Nos. 5,272,236; 5,278,272; 5,783,638; 5,665,800; and U.S. Ser. No. 08/455,302 filed Aug. 18, 1995 (all of which are here incorporated by reference). As here used, "measurable" means that the techniques of $^{13}$C NMR and GPC/DV can detect 0.01 or more branches of 6 carbons or more per 1000 carbons.

The homogeneously branched linear ethylene polymers are interpolymers in which any comonomer (preferably an α-olefin having from 3 to 20 carbon atoms) is randomly distributed within a given interpolymer molecule and wherein substantially all the interpolymer molecules have the same ethylene/comonomer ratio within that interpolymer. The homogeneity of the interpolymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al., Journal of Polymer Science, Poly. Phys. Ed., vol. 20, p 441 (1982), in U.S. Pat. No. 4,798,081 (Hazlitt et al.), in U.S. Pat. No. 5,008,204 (Stehling) or in U.S. Pat. No. 5,089,321 (Chum et al.) the disclosures of which are incorporated herein by reference. The SCBDI or CDBI for the linear and for the olefin polymers of the present invention is greater than about 30 percent, preferably greater than about 40 percent, especially greater than 70 percent.

The homogeneously branched linear ethylene polymers used in this invention lack a measurable "high density" fraction as measured by the TREF technique (i.e., the homogeneously branched linear ethylene polymers do not contain a polymer fraction with a degree of branching less than or equal to 2 methyls/1000 carbons). The homogeneously branched linear ethylene polymers also do not contain any highly short chain branched fraction (i.e., the homogeneously branched linear ethylene polymers do not contain a polymer fraction with a degree of branching equal to or more than about 30 methyls/1000 carbons).

Representative of commercially available homogeneous linear ethylene polymers are TAFMER™ made by Mitsui Petrochemical Industries, Ltd. and EXACT™ made by Exxon Chemical Company in the United States.

As here used, "substantially linear" means that the polymer backbone is substituted with about 0.01 long-chain branches/1000 total carbons to about 3 long-chain branches/1000 total carbons, preferably from about 0.01 long-chain branches/1000 total carbons to about 1 long-chain branch/1000 total carbons, and more preferably from about 0.05 long-chain branches/1000 total carbons to about 1 long-chain branch/1000 total carbons. Long-chain branching is here defined as a chain length of at least about 6 carbon atoms, above which the length cannot be distinguished using $^{13}$C nuclear magnetic resonance spectroscopy, yet the long-chain branch can be about the same length as the length of the polymer backbone.

Preferred ethylene/α-olefin interpolymers are ethylene/1-dodecene, ethylene/1-decene, ethylene/1-octene, ethylene/1-hexene, ethylene/4-methyl-1-pentene, ethylene/1-pentene, ethylene/1-butene and ethylene/propylene copolymers produced via a constrained geometry single site catalyst. A process for making such copolymers is described in U.S. Pat. Nos. 5,272,236 and 5,278,272. Such ethylene interpolymers are preferably substantially linear olefin polymers having long chain branching. Substantially linear olefin polymers can be made by gas phase, solution phase, high pressure or slurry polymerization. These polymers are preferably made by solution polymerization. Substantially linear ethylene polymers (SLEPs) are commercially available from The Dow Chemical Co. under the trademark AFFINITY and from DuPont Dow Elastomers L.L.C. under the trademark ENGAGE.

These SLEPs are prepared by using constrained geometry catalysts (CGC), and are characterized by a narrow molecular weight distribution and by a narrow comonomer distribution. Other basic characteristics of SLEPs include a low residuals content (i.e. low concentrations in the SLEP polymer of the catalyst used to prepare the polymer, unreacted comonomers, if any, and low molecular weight oligomers made during the course of the polymerization), and a controlled molecular architecture which provides good processability even though the molecular weight distribution is narrow relative to conventional olefin polymers.

The SLEPs preferred in this invention comprise between about 98 and about 75 weight percent ethylene, and about 2, more preferably at least about 7.5, up to about 25, more preferably up to about 14.0, weight percent of at least one α-olefin comonomer. The SLEPs used in this invention are interpolymers of ethylene and an α-olefin. Preferably, the α-olefin is a 3 to 8 carbon atom α-olefin (e.g. propylene, 1-butene, 1-hexene, 4-methyl-1-pentene, 1-heptene, 1-octene, etc.).

The homogeneous branched ethylene polymers of this invention have a density (measured in accordance with ASTM D792) of about 0.850 to about 0.940 grams per cubic centimeter (g/cm$^3$), preferably of about 0.870 to about 0.910 g/cm$^3$. The melt ratio, measured as $I_{10}/I_2$ ($I_{10}$ measured by ASTM D-1238 condition 190/10), is 190 C/10 kg greater than or equal to about 5.63, and is preferably from about 6.5 to about 15, more preferably from about 7 to about 10. The molecular weight distribution ($M_w/M_n$), measured by gel permeation chromatography (GPC), is defined by the equation:

$$M_w/M_n \leq (I_{10}/I_2) - 4.63,$$

and is preferably between about 1.8 and about 2.5. For the substantially linear ethylene polymers, the $I_{10}/I_2$ ratio indicates the degree of long-chain branching, i.e. the larger the $I_{10}/I_2$ ratio, the more long-chain branching in the polymer.

The unique characteristic of the homogeneously branched, substantially linear ethylene polymers is a highly unexpected property where the $I_{10}/I_2$ value of the polymer is essentially independent of the polydispersity index (i.e., $M_w/M_n$) of the polymer. This is contrasted with conventional linear homogeneously branched and linear heterogeneously branched polyethylene resins having rheological properties such that to increase the $I_{10}/I_2$ value the polydispersity index must also be increased.

The molecular weight distributions of the polymers are determined by gel permeation chromatography (GPC) on a Waters 150 C. high temperature chromatographic unit equipped with a differential refractometer and three columns of mixed porosity. The columns are supplied by Polymer Laboratories and are commonly packed with pore sizes of 10$^3$, 10$^4$, 10$^5$ and 10$^6$ Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_j = (\Sigma w_i(M_i^j))^j$; where $w_i$ is the weight fraction of the molecules with molecular weight $M_i$ eluting from the GPC column in fraction i and j=1 when calculating $M_w$ and j=-1 when calculating $M_n$. The homogeneous ethylene polymer has $M_w/M_n$ less than or equal to 3.3, preferably less than or equal to 3, and especially in the range of from about 1.5 to about 2.5.

The preferred melt index, measured as $I_2$ (ASTM D-1238, condition 190/2.16 (formerly condition E)), is from about 0.5 g/10 min to about 20 g/10 min, more preferably about 1 to about 5 g/10 min. Typically, the preferred SLEPs used in the construction of the plastic films used in this practice of this invention are homogeneously branched and do not have any measurable high density fraction, (i.e. short chain branching distribution as measured by Temperature Rising Elution Fractionation which is described in U.S. Pat. No. 5,089,321, and which is incorporated herein by reference), e.g. they do not contain any polymer fraction that has a degree of branching less than or equal to 2 methyl/1000 total carbons. These preferred SLEPs also usually have a single differential scanning calorimetry (DSC) melting peak. Of course, the particular properties of the SLEP used in the practice of this invention will depend in large part upon the particulars of the method used to package the food, e.g. the preferred properties of a film used in a shrink wrap method are different than the preferred properties of a film used in a stretch overwrap method.

In those embodiments in which the film structure is a monolayer, the monolayer can comprise up to about 50, preferably up to about 25, weight percent of at least one SLEP. The monolayer may also contain additives to impart to or enhance certain properties of the film, and these additives include fillers, antioxidants, antifogging agents (such as those taught in U.S. Pat. Nos. 4,835,194 and 4,486,552), plasticizers, etc.

The SLEP used to construct the monolayer will depend on the properties desired in the film and in those embodiments in which two or more SLEPs are used in the construction of the film, these polymers are selected in part based on their compatibility with one another under both processing and use conditions. Similarly, if a blend of one or more SLEPs and one or more non-SLEPs (e.g. conventional, homogeneously branched linear ethylene/α-olefin copolymers made as described in U.S. Pat. No. 3,645,992, or conventional, heterogeneously branched ethylene/α-olefin copolymers made by the Ziegler process as described in U.S. Pat. No. 4,076,698, both disclosures of which are incorporated herein by reference) are used in the construction of the monolayer, then these non-SLEPs are selected in part based on their compatibility with the SLEP(s).

In those embodiments in which the film structure is multilayer comprising at least one LDPE inner layer sandwiched between two outer layers comprising SLEPs, it can be of any conventional structure, e.g. 3-ply, 4-ply, 5-ply, 6-ply, 7-ply, etc. Those layer(s) constructed from polymer other than an SLEP can comprise any suitable material generally compatible with a film constructed from an SLEP, e.g. one or more conventional LDPE, LLDPE, ULDPE, EVA, EAA, and the like, preferably an LDPE. Additives such as those described above with respect to monolayer films can also be used in these multilayer films, and these additives can be incorporated into any of the film layers as desired, e.g. slip agents into one or both outer layers, fillers in one or more inner layers, etc.

Film structures having the properties attributable to using one or more SLEPs for one or more layers can be made using simple cast/sheet extrusion or co-extrusion.

Multilayer film manufacturing techniques for food packaging applications are described in *Packaging Foods With Plastics* by Wilmer A. Jenkins and James P. Harrington (1991), pp. 19–27, and in "Co-extrusion Basics" by Thomas I. Butler, *Film Extrusion Manual: Process Materials, Properties*, pp. 31–80 (published by TAPPI Press (1992)).

In certain embodiments of this invention at least one outer layer of the film structure comprises a heat sealable, preferably hot tackable, SLEP. This heat sealable outer layer(s) can be coextruded with the other layer(s) or the heat sealable outer layer(s) can be laminated onto another layer(s) in a secondary operation, such as that described in *Packaging Foods With Plastics*, ibid, or that described in "Co-extrusion For Barrier Packaging" by W. J. Schrenk and C. R. Finch, *Society of Plastics Engineers RETEC Proceedings*, Jun. 15–17 (1981), pp. 211–229. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), then the sealant film must go through an additional post-extrusion step of adhesive or extrusion lamination to other packaging material layers to form a multilayer structure. If the sealant film is a co-extrusion of two or more layers (also described by Osborn and Jenkins), the film may still be laminated to additional layers of packaging materials, depending on the other physical requirements of the final packaging film. "Laminations vs. Coextrusions" by D. Dumbleton (*Converting Magazine*, September 1992) also discusses lamination versus coextrusion. Monolayer and coextruded films can also go through other post-extrusion techniques, such as a biaxial orientation process and irradiation. With respect to irradiation, this technique can also precede extrusion by irradiating the pellets from which the film is to be fabricated prior to feeding the pellets into the extruder.

Cast film systems are well-known in the art, see, e.g., Edward A. Muccio, *Plastics Processing Technology*, ASTM Int'l (1994), pp. 99–101. A cast film system comprises introducing solid polymer resin into an extruder which is used to provide heat to melt the polymer. Typical melt temperatures for cast film systems are 230 to 320 C. The extruder also provides the pressure which is required to force the molten polymer through a forming die.

The forming die design is known in the art and can be either a "coat hanger" or a T-shaped design. The forming die comprises a slit which generally has a gap width of 0.38 to 1.0 mm. The forming die can be supplied with molten polymer by more than one extruder in a process known as coextrusion. Each extruder in a coextrusion process can supply the same, or a different polymer than the other extruders. The molten polymer supplied by each extruder is formed into a separate layer by the forming die. Each layer welds together to form a continuous matrix. The molten polymer(s), whether one layer or multi-layer, exit the forming die as a thin ribbon which comprises the film structure.

The molten film structure is rapidly cooled by contact with at least one, preferably at least two chill rolls. Chill rolls are polished to a mirror finish on the outside and are hollow on the inside. Typically, chill rolls are maintained at a temperature between about 27 to about 50 C. by means of circulating a coolant through the hollow inside of the roll. The melted film structure contacts the first chill roll tangentially. Normally, the film is pinned against the surface of the first chill roll by the air stream from an air knife. The film is S-threaded through the chill rolls.

The cooled film passes over a series of rollers en route to a wind-up roll. The wind-up roll pulls the film through the rollers and collects the finished film by wrapping the film around spools. The film edges are typically trimmed off prior to winding because the edges tend to be thicker than the rest of the film.

One aspect of this invention is inducing a machine-direction (MD) orientation in the homogeneously branched polyethylene layer or component of the inventive film via high die draw down ratios, high line speeds, small air gaps between the die exit and the chill roll, low melt temperature or a combination of these factors. The draw down ratio (DDR) is the ratio of the die gap to the final film thickness. Preferably, the draw down ratio ranges from about 50 to about 150, more preferably to about 90. High line speeds are typically at least about 150 m/min, preferably at least about 350 m/min. In the cast film process of this invention, small air gaps between the die exit and the first chill roll are considered to be between about 15 and about 80 mm, preferably about 25 to about 40 mm. Preferably, the melt temperature for the homogeneously branched polyethylene is at least about 200, preferably at least about 220, more preferably at least about 230, up to no more than about 300, preferably no more than about 280, more preferably no more than about 260 C.

Relaxation time is a measure of the rate at which stress decays. Relaxation time can be defined as:

$$\text{relaxation time} = \eta/E, \qquad (I)$$

where $\eta$ is the viscosity of the melted polymer and E is Young's modulus (defined as tensile stress (force per unit area) divided by elongation (change in length divided by original length)). The viscosity, $\eta$, refers to Newtonian viscosity or any apparent viscosity derived from non-Newtonian models, e.g., pseudoplastic, Bingham plastic, time dependent, viscoelastic, etc. Relaxation time is known in the art, see, e.g., Ferdinand Rodriguez, *Principles of Polymer Systems*, McGraw-Hill (1970), pp. 205–206. The relaxation time of the homogeneously branched polyethylene must be less than the relaxation time of the LDPE. Additionally, the relaxation time of the homogeneously branched polyethylene must be short enough to allow enough relaxation such that at least partial machine-direction orientation is imposed on the homogeneously branched polyethylene, as characterized by the homogeneously branched polyethylene having a machine-direction elongation of less than about 200, preferably less than about 100, percent as determined by ASTM D882 using a sample width of 10 mm.

Typically, the relaxation time of the homogeneously branched polyethylene is at least about 0.005, preferably at least about 0.01, more preferably at least about 0.05, most preferably at least about 0.1, up to about 1.0, seconds. Typically, the relaxation time of the LDPE is at least about 0.5, preferably at least about 1.0, up to about 10, preferably up to about 5.0, seconds. The exact relaxation times will be dependent on molecular weight and melt temperature.

The inner layers of the multilayer structure typically include, but are not limited to, barrier layers and/or structural layers. These layers can be constructed from various materials, including SLEPs, and some layers can be constructed of the same materials, e.g. some films can have the structure A/B/C/B/A. Representative, non limiting examples of the non-SLEP materials are: metal foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g. maleic anhydride grafted polyethylene), paper and paperboard. Generally, the multilayer film structures comprise from 2 to about 7 layers.

The thickness of the multilayer structures is typically from about 0.25 mil to about 10 mils (total thickness). The sealant layer varies in thickness depending on whether it is produced via co-extrusion or lamination of a monolayer or coextruded film to other packaging materials. In a co-extrusion, the sealant layer is typically from about 10% of the total film structure up to about 5 mils, preferably from about 0.035 to about 3 mils. In a laminated structure, the monolayer or coextruded sealant film is typically from about 0.5 to about 5 mils, preferably from about 1 to about 3 mils. For a monolayer film, the thickness is typically between about 0.25 mil to about 5 mils, preferably between about 0.35 to about 1.5 mils.

In those film structures incorporating an antifogging agent, the core layer(s) preferably consists of a nonpolar, hydrophobic polymer, e.g. an LDPE. Antifogging agents are generally located in the skin layers of such a structure. These agents are hydrophilic materials that interact with water (either from the atmosphere relative to the skin layer most removed from the wrapped food, or from the food by way of evaporation relative to the skin layer in contact with the food) such that water droplets do not form on the surface of the skin layer (thus "fogging" the film). This fogging, particularly on the skin layer in contact with the food, results in reduced product visibility and shelf life, and thus reduced commercial value.

In those structures with a core layer having a polar, hydrophilic nature, e.g. a core layer comprising EAA or EVA, the antifogging agent tends to migrate toward it. This depletes the concentration of antifogging agent at the exposed surfaces of the outer layers, and this in turn renders the film more susceptible to fogging. In multilayer film structures without a polar, hydrophilic core layer, the antifogging agent remains relatively dispersed throughout the outer layers.

Notwithstanding this disadvantage relative to antifogging agents, some food wrapping applications may be better served if the one or more of the core layers are constructed from a polar, hydrophilic material and the outer layers are constructed from a nonpolar, hydrophobic material. One example of such a film structure is CGC-polymer/EAA/CGC-polymer which is useful in wrapping retail-cut red meat and similar food products.

Other desirable properties of the plastic films used in this invention include, depending on the nature of the other film layers in the structure, ease of fabrication and good oxygen permeability (particularly with respect to films made from such copolymers as EVA and EAA), oxygen impermeability (particularly with respect to films containing an oxygen barrier such as SARAN or ethylene vinyl alcohol), dart impact, puncture resistance, tensile strength, low modulus, tear resistance, shrinkability, high clarity and a low affect on the taste and odor properties of the packaged food.

Moreover, those films in which a layer comprising an SLEP replaces an EVA, EAA or similar layer, e.g. as the middle layer of a 3-ply film in which the two exterior layers are conventional LLDPE, recycle better than a film with an EVA, etc. layer. Since SLEPs are often made from the same or near same monomers as other polyethylene polymers, i.e. ethylene and/or an α-olefin, they are highly compatible with such polyethylene copolymers as LDPE, LLDPE, HDPE, ULDPE, and the like. Because of their polar functionality, EVA, EAA and like copolymers are not highly compatible with nonpolar ethylene polymers (such as those used in the Examples). This is an important consideration in the recycling of edge-trim and other film processing scraps. In addition, film structures comprising EAA or a similar material may impart an offensive taste or odor to the packaged food due to the presence of thermal degradation products formed during fabrication.

In those embodiments which employ a sealant layer comprising an SLEP, preferably the sealant layer comprises only an SLEP. However, non-SLEPs can be blended with the SLEP to modify the processing, strength, inherent cling level or heat seal characteristics of the sealant layer of the final film structure. Some useful polymer blend components include, for example, high pressure low density polyethylene (LDPE), EVA, polybutylene (PB), and LLDPE. Preferably, the SLEPs comprise at least about 20 weight percent, more preferably at least about 50 weight percent, of the sealant layer blend composition. Highly preferably, the sealant layer is 100 weight percent SLEP.

One hallmark of the film of this invention is a cross-directional tear value from 2 to 200 grams (g) when measured by Elmendorf tear method, ASTM D1922. Preferably, the cross-directional tear value will be less than 40 g for a film thickness of 15 microns ($\mu$m).

Another hallmark of the film of this invention is a high inherent cling, which is defined as the cling obtainable without the addition of migratory tackifiers, e.g., polyisobutylene, as used in conventional polyethylene and PVC stretch wraps. Preferably, the inherent cling is at least about 200, more preferably at least about 1000, grams when measured using ASTM D4649.

Another hallmark of the film of this invention is low haze as compared to PVC films. Typical films of this invention have a haze value of about 0.5 to about 5.0 percent when measured according to ASTM D1003. Preferably, the haze value is less than about 1.0 percent for a 15 $\mu$m film of this invention.

Another hallmark of the film of this invention is resistance to stretch in the machine direction as characterized by machine direction tensile strength of about 25 to about 50, preferably about 45 to about 50 megapascals (Mpa) and machine direction elongation of less than about 200, preferably less than about 100 percent, determined using ASTM D882 and a specimen width of 10 mm.

The plastic films of this invention and their use as a food wrap are more fully described by the following examples. Unless indicated to the contrary, all parts and percentages are by weight. These details and examples are provided for illustration only and do not limit the scope of the invention.

EXAMPLES

Example 1 is prepared from a polymer blend. The blend is made by mixing 25 parts of a homogeneously branched SLEP with 75 parts of an LDPE. The SLEP has a melt index of 3.0 g/10 min, a density of 0.902 g/cc and is commercially available as AFFINITY™ FW 1650 from The Dow Chemical Co. The LDPE has a melt index of 3.5 g/10 min., a density of 0.923 g/cc, an of 16,000 and is commercially available under the trademark LOTRENE FD 0474 from Qatar Petrochemical Company Ltd.

Example 2 is prepared as a multi-layer film structure from non-blended polymers. The two outer layers consist of a SLEP with a melt index of 3.0 g/10 min, a density of 0.902 g/cc and commercially available as AFFINITY™ FW 1650 from The Dow Chemical Co. The core layer consists of an LDPE with a melt index of 5.0 g/10 min, a density of 0.923 g/cc, an $M_n$ of 15,100 and is commercially available under the trademark COSMOTHENE 410-3 from The Polyolefin Company (Singapore) Private Limited.

A 7-8000 MTPA Dolchi ABC cast film system is used to melt the polymer blend and or the polymers and form them into film structures. This system has three extruders, A, B and C, each of which can be fed with a different polymer or polymer blend. The output from the Dolchi system is cast as a single layer film structure or as a multilayer film structure. Example 1, a monolayer film structure, and Example 2, a 3-layer film structure, are prepared according to the conditions shown in Table 1.

The physical properties of the films are reported in Table 2.

TABLE 1

Production Conditions for Examples 1 and 2

| Process Condition | Example 1 | Example 2 |
|---|---|---|
| Film Structure | Monolayer | 3-layer |
| Polymer for Extruder A | BLEND[1] | AFFINITY FW1650 |
| Polymer for Extruder B | BLEND[1] | Cosmothene 410-3 |
| Polymer for Extruder C | BLEND[1] | AFFINITY FW1650 |
| Melt Temperature (C.), Extruder A | 256 | 254 |
| Melt Temperature (C.), Extruder B | 242 | 256 |
| Melt Temperature (C.), Extruder C | 251 | 260 |
| Line Speed (m/min) | 250 | 317 |
| Output (kg/hr) | 300 | 496 |
| Die Gap (mm) | 0.8 | 0.8 |
| Air Gap (mm) | 89 | 64 |

[1]BLEND refers to a blend of 75% Lotrene FD0474 and 25% AFFINITY FW1650.

Table 2 shows a comparison of physical properties of the films of Examples 1–2, and two commercial comparative products. The results show that a film structure comprising an LDPE and an SLEP, in either a coextruded or a monolayer, exhibit low cross-directional Elmendorf tear values that are close to incumbent commercially available PVC and LDPE films. These cross-directional Elmendorf tear values indicate the film structures of this invention exhibit the desired easy tear characteristic.

Additionally, the results show that the film structures of this invention have a machine-direction elongation value about 50 to 80 percent lower than the incumbent commercially available food wraps. This reduction in the machine-direction elongation facilitates the easy-tear feature of the invention film structure by decreasing the stretch of the film during the tear operation.

The film structures of this invention also demonstrate an increase in puncture resistance over the comparative LDPE film.

TABLE 2

Comparison of Physical Characteristics

| Physical Characteristics | ASTM Method | Example 1 | Example 2 | PVC Film[1] | PE Film[2] |
|---|---|---|---|---|---|
| Gauge (μm) | | 11 | 11 | 9 | 8 |
| Machine-direction Elmendorf tear value (N) | D1922 | <0.4 | <0.2 | <0.2 | <0.2 |
| Machine-direction ultimate tensile value (Mpa) | D882* | 46 | 47 | 53 | 32 |
| Machine-direction tensile elongation (percent) | D882* | 90 | 69 | 306 | 177 |
| Machine-direction tensile energy (J) | D882* | 0.08 | 0.05 | 0.24 | 0.10 |
| Machine-direction tensile yield (Mpa) | D882* | 32 | 2.7 | 15.5 | 7.1 |
| Cross-direction Elmendorf tear value (N) | D1922 | <0.4 | <0.2 | <0.2 | <0.2 |
| Cross-direction ultimate tensile value (Mpa) | D882* | 16 | 22 | 40 | 18 |
| Cross-direction tensile elongation (percent) | D882* | 683 | 946 | 378 | 617 |
| Cross-direction tensile energy (J) | D882* | 0.2 | 0.37 | 0.24 | 0.16 |
| Cross-direction tensile yield (Mpa) | D882* | 10 | 11.3 | 11.8 | 13.6 |
| Puncture strength (N) | | 15.9 | 15.9 | 24.6 | 10.4 |
| Puncture elongation (percent) | | 47 | 49 | 73 | 56 |
| Puncture energy (J) | | 0.3 | 0.3 | 0.7 | 0.2 |
| Gloss @ 45° | D2457 | 91 | 88 | 79 | 81 |
| Haze (percent) | D1003 | 0.7 | 1.1 | 1.0 | 1.2 |
| Shear cling (g) | D4649 | 1014 | 711 | 408 | 391 |

*Modified ASTM D882 = sample length of 25 mm, sample width of 10 mm, crosshead speed 500 mm/min
[1]The PVC film is a blown film commercially marketed by Caterpak, Australia.
[2]The LDPE is a commercially available film fabricated by National Pak, Australia under the trademark of Glad Products.

What is claimed is:

1. An oriented film structure for an easy-tear food wrap, the film structure comprising at least one layer, the layer comprising:
    (A) at least one homogeneously branched polyethylene comprising an interpolymer of ethylene, the homogeneously branched polyethylene characterized by a:
        (i) density less than about 0.940 g/cm$^3$,
        (ii) melt index of about 0.5 to about 20 g/10 min, and
        (iii) relaxation time of about 0.005 to about 1.0 s; and
    (B) at least one LDPE characterized by a:
        (i) melt index of about 2.0 to about 20.0 g/10 min,
        (ii) number average molecular weight of less than about 17,000, and
        (iii) relaxation time of about 0.5 to 5.0 s, wherein the relaxation time of the LDPE is longer than the relaxation time of the homogeneously branched polyethylene, wherein the film structure has a machine-direction orientation as characterized by:
            (1) a machine direction elongation of less than about 200% as determined by ASTM D882 using a sample width of 10 mm and; (2) a cross-directional tear value of from about 2 to about 200 grams, when measured by Elmendorf tear method ASTM D1922.

2. The film structure of claim 1 further comprising at least one anti-fog agent.

3. The film structure of claim 1 wherein the α-olefin is present in the interpolymer in an amount up to about 25 percent, based on the weight of the interpolymer.

4. The film structure of claim 1 wherein the α-olefin is at least one $C_3$–$C_8$ α-olefin.

5. The film structure of claim 1 wherein the homogeneously branched polyethylene comprises up to 50 weight percent of the film structure.

6. The film structure of claim 1 wherein the homogeneously branched polyethylene comprises a substantially linear ethylene polymer (SLEP).

7. The film structure of claim 1 characterized by
    (i) a cross-directional tear value of from about 2 to about 200 grams, when measured by Elmendorf tear method ASTM D1922,
    (ii) by an inherent cling of at least about 200 grams, when measured using ASTM D4649,
    (iii) by a haze value of less than about 5.0 percent, when measured using ASTM D1003,
    (iv) a machine-direction tensile strength of at least about 25 to about 50 Mpa, as determined by ASTM D882 and a specimen width of 10 mm, (v) a machine-direction elongation of less than 200 percent determined using ASTM D882 and a specimen width of 10 mm, and (vi) a cross-direction elongation of at least about 100 percent determined using ASTM D882 and a specimen width of 10 mm.

8. An oriented film structure for an easy-tear food wrap, the film structure comprising two outer layers and one inner layer, each outer layer abutting the inner, wherein:

(A) each outer layer comprising at least one homogeneously branched polyethylene comprising an interpolymer of ethylene and at least one α-olefin, the homogeneously branched polyethylene characterized by a:

(i) density less than about 0.940 g/cm$^3$, (ii) melt index of about 0.5 to about 20 g/10 min, and (iii) relaxation time of about 0.005 to about 1.0 s; and (B) the inner layer comprising at least one LDPE characterized by a:

(i) melt flow index of about 2.0 to about 20.0 g/10 min, (ii) number average molecular weight of less than about 17,000, and (iii) relaxation time of about 0.5 to 5.0 s, wherein the relaxation time of the LDPE is longer than the relaxation time of the homogeneously branched polyethylene, wherein the film structure has a machine-direction orientation as characterized by: (1) a machine direction elongation of less than about 200% as determined by ASTM D882 using a sample width of 10 mm and; (2) a cross-directional tear value of from about 2 to about 200 grams, when measured by Elmendorf tear method ASTM D1922.

9. The film structure of claim 8, further comprising at least one anti-fog agent.

10. The film structure of claim 8, wherein the α-olefin is present in the interpolymer in an amount up to about 25 percent, based on the weight of the interpolymer.

11. The film structure of claim 8, wherein the α-olefin is at least one $C_3$–$C_{8}$-olefin.

12. The film structure of claim 8, wherein the homogeneously branched polyethylene comprises up to 50 weight percent of the film structure.

13. The film structure of claim 8, wherein the homogeneously branched polyethylene comprises a substantially linear ethylene polymer (SLEP).

14. The film structure of claim 8, characterized by:

(i) a cross-directional tear value of from about 2 to about 200 grams, when measured by Elmendorf tear method ASTM D1922, (ii) by an inherent cling of at least about 200 grams, when measured using ASTM D4649, (iii) by a haze value of less than about 5.0 percent, when measured using ASTM D1003, (iv) a machine-direction tensile strength of at least about 25 to about 50 Mpa, as determined by using ASTM D882 and a specimen width of 10 mm, (v) a machine-direction elongation of less than 200 percent determined using ASTM D882 and a specimen width of 10 mm, and (vi) a cross-direction elongation of at least about 100 percent determined using ASTM D882 and a specimen width of 10 mm.

15. A method of producing an oriented film structure for all easy-tear food wrap, the method comprising the steps:

(A) admixing at least two components to form a mixture, the mixture comprising (i) at least one homogeneously branched polyethylene comprising an interpolymer of ethylene and at least one α-olefin, the homogeneously branched polyethylene characterized by:

(a) a density less than about 0.940 g/cm$^3$, (b) a melt index of 0.5 to 20 g/10 min, and (c) a relaxation time of about 0.005 to about 1.0 s; and (ii) at least one low-density polyethylene (LDPE), the LDPE characterized by:

(a) a melt flow index of 2.0 to 20.0 g/10 min, (b) a number average molecular weight of less than about 17,000, (c) a relaxation time of about 0.5 to 5.0 s, wherein the relaxation time of the LDPE is longer than the relaxation time of the homogeneously branched polyethylene;

(B) heating the mixture to melt the mixture;

(C) forming the melted mixture into a molten film structure, the molten film structure comprising at least one layer in which both the homogeneously branched polyethylene and the LDPE are oriented in the cross-direction;

(D) imposing a machine-direction stress in the molten film structure via mechanical means or thermal means or both in order to obtain a machine-direction orientation in the homogeneously branched polyethylene in preference to in the LDPE;

(E) cooling the molten film structure to solidify the film structure, such that the time elapsed between forming the molten film structure and solidifying the film structure is less than the relaxation time of the LDPE, thereby freezing the homogeneously branched polyethylene in the machine-direction orientation and the LDPE in a cross-direction orientation, wherein the solid film structure has a machine-direction orientation as characterized by: (1) a machine direction elongation of less than about 200% as determined by ASTM D882 using a sample width of 10 mm and; (2) a cross-directional tear value of from about 2 to about 200 grams, when measured by Elmendorf tear method ASTM D1922.

16. The method of claim 15, wherein the mechanical means for imposing a machine-direction stress in the molten film structure comprises a cast film forming line, the cast film forming line characterized by:

(i) a line speed of at least 150 m/min, (ii) a draw down ratio of at least about 50 up to about 150, (iii) an air gap of at least about 15 up to about 80 mm.

17. The method of claim 15, wherein the mixture further comprises at least one anti-fog agent.

18. The method of claim 15, wherein the α-olefin is present in the interpolymer in an amount up to about 25 percent, based on the weight of the interpolymer.

19. The method of claim 15, wherein the α-olefin is at least one $C_3$–$C_8$ α-olefin.

20. The method of claim 15, wherein the homogeneously branched polyethylene comprises up to 50 weight percent of the mixture.

21. The method of claim 15, wherein the homogeneously branched polyethylene comprises a substantially linear ethylene polymer (SLEP).

22. The method of claim 15, wherein the solid film structure is characterized by:

(i) a cross-directional tear value of from about 2 to about 200 grams, when measured by Elmendorf tear method ASTM D1922, (ii) by an inherent cling of at least about 200 grams, when measured using ASTM D4649,
(iii) by a haze value of less than about 5.0 percent, when measured using ASTM D1003,
(iv) a machine-direction tensile strength of at least about 25 to about 50 Mpa, as determined by using ASTM D882 and a specimen width of 10 mm,
(v) a machine-direction elongation of less than 200 percent determined using ASTM D882 and a specimen width of 10 mm, and
(vi) a cross-direction elongation of at least about 100 percent determined using ASTM D882 and a specimen width of 10 mm.

23. The film structure obtainable by the method of claim 15.

24. A method of producing an oriented film suture for an easy-tear food wrap, the method comprising the steps:
(A) melting at least one homogeneously branched polyethylene comprising an interpolymer of ethylene and at leas one α-olefin, the homogeneously branched polyethylene characterized by a:
  (i) density less than about 0.940 g/cm³,
  (ii) melt index of about 0.5 to about 20 g/10 min, and
  (iii) a relaxation time of about 0.005 to about 1.0 s; and
(B) melting, separately from the homogeneously branched polyethylene, at least one LDPE characterized by a:
  (i) melt flow index of about 2.0 to about 20.0 g/10 min,
  (ii) number average molecular weight of less than about 17,000,
  (iii) relaxation time of about 0.5 to 5.0 s, wherein the relaxation time of the LDPE is longer than the relaxation time of the homogeneously branched polyethylene; and
(C) forming the melted homogeneously branched polyethylene of (A) and the melted LDPE of (B) into a soft film structure, wherein:
  (i) the molten film structure comprises an inner layer comprising the LDPE sandwiched between two outer layers, of the homogeneously branched polyethylene, and
  (ii) both the homogeneously branched polyethylene and the LDPE are oriented in the cross-direction;
(D) imparting a machine-direction orientation to the homogeneously branched polyethylene relative to the LDPE; and
(E) solidifying the molten film structure such that the time elapsed between forming the film structure and solidifying it is about 0.005 to about 1.0 s, thereby freezing the homogeneously branched polyethylene in a machine-direction orientation and the LDPE in a cross-direction orientation,
wherein the solid film structure has a machine-direction orientation as characterized by; (1) a machine direction elongation of less than about 200% as determined by ASTM D882 using a sample width of 10 mm and; (2) a cross-directional tear value of from about 2 to about 200 grams, when measured by Elmendorf tear method ASTM D1922.

25. The method of claim 24, wherein the mechanical means for imposing a machine-direction stress in the molten film structure comprises a cast film forming line, the cast film forming line characterized by:
(i) line speed of at least 150 m/min,
(ii) draw down ratio of at least about 50 up to about 150,
(iii) air gap of at least about 15 up to about 80 mm.

26. The method of claim 24, wherein the mixture further comprises at least one anti-fog agent.

27. The method of claim 24, wherein the α-olefin is present in the interpolymer in an amount up to about 25 percent, based on the weight of the interpolymer.

28. The method of claim 24, wherein the α-olefin is at least one $C_3-C_8$ α-olefin.

29. The method of claim 24, wherein the homogeneously branched polyethylene comprises up to 50 weight percent of the mixture.

30. The method of claim 24, wherein the homogeneously branched polyethylene comprises a substantially linear ethylene polymer (SLEP).

31. The method of claim 24, wherein the solid film structure is characterized by:
(i) a cross-directional tear value of from about 2 to about 200 grams, when measured by Elmendorf tear method ASTM D1922,
(ii) by an inherent cling of at least about 200 grams, when measured using ASTM D4649,
(iii) by a haze value of less than about 5.0 percent, when measured using ASTM D1003,
(iv) a machine-direction tensile strength of at least about 25 to about 50 Mpa, as determined by ASTM D882, and
(v) a machine-direction elongation of less than 200 percent determined using ASTM D882 and a specimen width of 10 mm.

32. The film structure obtainable by the method of claim 24.

33. An oriented film structure for an easy-tear food wrap, the film structure comprising at least one layer, the layer comprising:
(A) at least one heterogeneously branched linear polyethylene comprising an interpolymer of ethylene and at least one α-olefin, the heterogeneously branched linear polyethylene characterized by:
  (i) a density less than about 0.940 g/cm³,
  (ii) a melt index of about 0.5 to about 20 g/10 min, and
  (iii) a relaxation time of about 0.005 to about 1.0 s;
(B) at least one low-density polyethylene (LDPE), the LDPE characterized by:
  (i) a melt flow index of about 2.0 to about 20.0 g/10 min,
  (ii) a number average molecular weight of less than about 17,000,
  (iii) relaxation time of about 0.5 to 5.0 s, wherein the relaxation time of the LDPE is longer than the relaxation time of the homogeneously branched polyethylene, wherein the solid film structure has a machine-direction orientation as characterized by:
    (1) a machine direction elongation of less than about 200% as determined by ASTM D882 using a sample width of 10 mm and; (2) a cross-directional tear value of from about 2 to about 200 grams, when measured by Elmendorf tear method ASTM D1922.

34. An oriented film structure for an easy-tear food wrap, the film sate comprising two outer layers and one inner layer, each outer layer abutting the inner, wherein:
(A) each outer layer comprises at least one heterogeneously branched linear polyethylene comprising an interpolymer of ethylene and at least α-olefin, the heterogeneously branched linear polyethylene characterized by:
  (i) a density less than about 0.940 g/cm³,
  (ii) a melt index of about 0.5 to about 20 g/10 min, and
  (iii) a relaxation time of about 0.005 to about 1.0 s;

(B) the inner layer comprises at least one low-density polyethylene (LDPE), the LDPE characterized by:
  (i) a melt flow index of about 2.0 to about 20.0 g/10 min,
  (ii) a number average molecular weight of less than about 17,000,
  (iii) relaxation time of about 0.5 to 5.0 s, wherein the relaxation time of the LDPE is longer than the relaxation time of the homogeneously branched polyethylene wherein the solid film structure has a machine-direction orientation as characterized by: (1) a machine direction elongation of less than about 200% as determined by ASTM D882 using a sample width of 10 mm and; (2) a cross-directioned tea value of from about 2 to about 200 grams, when measured by Elmendorf tear, method ASTM D1922.

* * * * *